United States Patent
Natanzon et al.

(10) Patent No.: US 10,409,629 B1
(45) Date of Patent: Sep. 10, 2019

(54) AUTOMATED HOST DATA PROTECTION CONFIGURATION

(71) Applicant: EMC IP Holding Company LLC, Hopkinton, MA (US)

(72) Inventors: Assaf Natanzon, Tel Aviv (IL); Saar Cohen, Moshav Mishmeret (IL); Matan Gilat, Herdera (IL); Amit Lieberman, Raanana (IL); Jehuda Shemer, Kfar Saba (IL); Ravi V. Chitloor, Bangalore (IN); Yossef Saad, Gannei Tikva (IL); Prasanna Malaiyandi, Santa Clara, CA (US); Naveen Rastogi, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 169 days.

(21) Appl. No.: 15/275,756

(22) Filed: Sep. 26, 2016

(51) Int. Cl.
  *G06F 9/455* (2018.01)
  *G06F 16/2453* (2019.01)
  *G06F 16/332* (2019.01)

(52) U.S. Cl.
  CPC ........... *G06F 9/45558* (2013.01); *G06F 2009/45583* (2013.01)

(58) Field of Classification Search
  CPC ........... G06F 11/1461; G06F 11/1458; G06F 11/2094; G06F 9/45558; G06F 3/065; G06F 2009/45583
  See application file for complete search history.

(56) References Cited

U.S. PATENT DOCUMENTS

| | | | |
|---|---|---|---|
| 7,203,741 B2 | 4/2007 | Marco et al. | |
| 7,719,443 B1 | 5/2010 | Natanzon | |
| 7,840,536 B1 | 11/2010 | Ahal et al. | |
| 7,840,662 B1 | 11/2010 | Natanzon | |
| 7,844,856 B1 * | 11/2010 | Ahal | G06F 11/1471 702/120 |
| 7,860,836 B1 | 12/2010 | Natanzon et al. | |
| 7,882,286 B1 | 2/2011 | Natanzon et al. | |
| 7,934,262 B1 | 4/2011 | Natanzon et al. | |
| 7,958,372 B1 | 6/2011 | Natanzon | |
| 8,037,162 B2 | 10/2011 | Marco et al. | |
| 8,041,940 B1 | 10/2011 | Natanzon et al. | |
| 8,060,713 B1 | 11/2011 | Natanzon | |
| 8,060,714 B1 | 11/2011 | Natanzon | |

(Continued)

OTHER PUBLICATIONS

EMC Corporation, "EMC Recoverpoint/Ex;" Applied Technology; White Paper; Apr. 2012; 17 Pages.

(Continued)

*Primary Examiner* — Emerson C Puente
*Assistant Examiner* — Zhi Chen
(74) *Attorney, Agent, or Firm* — Daly, Crowley Mofford & Durkee, LLP

(57) ABSTRACT

A computer program product, system, and method for generating coded fragments comprises determining a set of available data protection plans; determining one or more parameters associated with a customer, a host, or a data protection system; generating a recommended host protection configuration for the host using the parameters, wherein the recommended host protection configuration includes one or more of the available data protection plans; and assigning the recommended host protection configuration to the host.

16 Claims, 4 Drawing Sheets

(56) References Cited

U.S. PATENT DOCUMENTS

| | | |
|---|---|---|
| 8,103,937 B1 | 1/2012 | Natanzon et al. |
| 8,108,634 B1 | 1/2012 | Natanzon et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,285,850 B1 * | 10/2012 | Jones ............... H04L 47/20 709/227 |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 | 8/2014 | Natanzon |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |
| 9,304,796 B1 * | 4/2016 | Douglas ............... G06F 11/2028 |
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Maranak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |

(56) References Cited

U.S. PATENT DOCUMENTS

| | | |
|---|---|---|
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 | 8/2017 | Natanzon et al. |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 9,875,042 B1 | 1/2018 | Natanzon et al. |
| 9,875,162 B1 | 1/2018 | Panidis et al. |
| 9,880,777 B1 | 1/2018 | Bono et al. |
| 9,881,014 B1 | 1/2018 | Bono et al. |
| 9,910,620 B1 | 3/2018 | Veprinsky et al. |
| 9,910,621 B1 | 3/2018 | Golan et al. |
| 9,910,735 B1 | 3/2018 | Natanzon |
| 9,910,739 B1 | 3/2018 | Natanzon et al. |
| 9,916,551 B1 * | 3/2018 | Bandopadhyay ............................ G06Q 10/06315 |
| 9,917,854 B2 | 3/2018 | Natanzon et al. |
| 9,921,955 B1 | 3/2018 | Derbeko et al. |
| 9,933,957 B1 | 4/2018 | Cohen et al. |
| 9,934,302 B1 | 4/2018 | Cohen et al. |
| 9,940,205 B2 | 4/2018 | Natanzon |
| 9,940,460 B1 | 4/2018 | Derbeko et al. |
| 9,946,649 B1 | 4/2018 | Natanzon et al. |
| 9,959,061 B1 | 5/2018 | Natanzon et al. |
| 9,965,306 B1 | 5/2018 | Natanzon et al. |
| 9,990,256 B1 | 6/2018 | Natanzon |
| 9,996,539 B1 | 6/2018 | Natanzon |
| 10,007,626 B1 | 6/2018 | Saad et al. |
| 10,019,194 B1 | 7/2018 | Baruch et al. |
| 10,025,931 B1 | 7/2018 | Natanzon et al. |
| 10,031,675 B1 | 7/2018 | Veprinsky et al. |
| 10,031,690 B1 | 7/2018 | Panidis et al. |
| 10,031,692 B2 | 7/2018 | Elron et al. |
| 10,031,703 B1 | 7/2018 | Natanzon et al. |
| 10,037,251 B1 | 7/2018 | Bono et al. |
| 10,042,579 B1 | 8/2018 | Natanzon |
| 10,042,751 B1 | 8/2018 | Veprinsky et al. |
| 10,055,146 B1 | 8/2018 | Natanzon et al. |
| 10,055,148 B1 | 8/2018 | Natanzon et al. |
| 10,061,666 B1 | 8/2018 | Natanzon et al. |
| 10,067,694 B1 | 9/2018 | Natanzon et al. |
| 10,067,837 B1 | 9/2018 | Natanzon et al. |
| 10,078,459 B1 | 9/2018 | Natanzon et al. |
| 10,082,980 B1 | 9/2018 | Cohen et al. |
| 10,083,093 B1 | 9/2018 | Natanzon et al. |
| 10,095,489 B1 | 10/2018 | Liberman et al. |
| 10,101,943 B1 | 10/2018 | Ayzenberg et al. |
| 10,108,356 B1 | 10/2018 | Natanzon et al. |
| 10,108,507 B1 | 10/2018 | Natanzon |
| 10,108,645 B1 | 10/2018 | Bigman et al. |
| 10,114,581 B1 | 10/2018 | Natanzon et al. |
| 10,120,787 B1 | 11/2018 | Shemer et al. |
| 10,120,925 B1 | 11/2018 | Natanzon et al. |
| 10,126,946 B1 | 11/2018 | Natanzon et al. |
| 10,133,874 B1 | 11/2018 | Natanzon et al. |
| 10,140,039 B1 | 11/2018 | Baruch et al. |
| 10,146,436 B1 | 12/2018 | Natanzon et al. |
| 10,146,639 B1 | 12/2018 | Natanzon et al. |
| 10,146,675 B1 | 12/2018 | Shemer et al. |
| 10,146,961 B1 | 12/2018 | Baruch et al. |
| 10,148,751 B1 | 12/2018 | Natanzon |
| 10,152,246 B1 | 12/2018 | Lieberman et al. |
| 10,152,267 B1 | 12/2018 | Ayzenberg et al. |
| 10,152,384 B1 | 12/2018 | Amit et al. |
| 10,157,014 B1 | 12/2018 | Panidis et al. |
| 10,185,583 B1 | 1/2019 | Natanzon et al. |
| 10,191,677 B1 | 1/2019 | Natanzon et al. |
| 10,191,687 B1 | 1/2019 | Baruch et al. |
| 10,191,755 B1 | 1/2019 | Natanzon et al. |
| 10,203,904 B1 | 2/2019 | Natanzon et al. |
| 10,210,073 B1 | 2/2019 | Baruch et al. |
| 10,223,007 B1 | 3/2019 | Natanzon et al. |
| 10,223,023 B1 | 3/2019 | Natanzon et al. |
| 10,223,131 B1 | 3/2019 | Lieberman et al. |
| 10,229,006 B1 | 3/2019 | Natanzon et al. |
| 10,229,056 B1 | 3/2019 | Panidis et al. |
| 10,235,055 B1 | 3/2019 | Saad et al. |
| 10,235,060 B1 | 3/2019 | Baruch et al. |
| 10,235,061 B1 | 3/2019 | Natanzon et al. |
| 10,235,064 B1 | 3/2019 | Natanzon et al. |
| 10,235,087 B1 | 3/2019 | Baruch et al. |
| 10,235,088 B1 | 3/2019 | Baruch et al. |
| 10,235,090 B1 | 3/2019 | Baruch et al. |
| 10,235,091 B1 | 3/2019 | Ayzenberg et al. |
| 10,235,092 B1 | 3/2019 | Natanzon et al. |
| 10,235,145 B1 | 3/2019 | Natanzon et al. |
| 10,235,196 B1 | 3/2019 | Natanzon et al. |
| 10,235,247 B1 | 3/2019 | Natanzon et al. |
| 10,235,249 B1 | 3/2019 | Natanzon et al. |
| 10,235,252 B1 | 3/2019 | Lieberman et al. |
| 10,250,679 B1 | 4/2019 | Natanzon et al. |
| 10,255,137 B1 | 4/2019 | Panidis et al. |
| 10,255,291 B1 | 4/2019 | Natanzon et al. |
| 2007/0220320 A1 * | 9/2007 | Sen ..................... G06F 11/1456 714/13 |
| 2008/0147821 A1 * | 6/2008 | Dietrich ............. G06F 17/30206 709/216 |
| 2009/0254593 A1 * | 10/2009 | Halim ................. G06F 11/1461 |
| 2009/0254971 A1 * | 10/2009 | Herz ...................... G06Q 10/10 726/1 |
| 2010/0262796 A1 * | 10/2010 | Camborde .......... G06F 11/1451 711/162 |
| 2013/0054518 A1 * | 2/2013 | Anglin .................... G06F 16/27 707/610 |
| 2014/0189680 A1 * | 7/2014 | Kripalani ............ G06F 11/3664 717/176 |
| 2014/0250070 A1 * | 9/2014 | Odenheimer ...... G06F 17/30575 707/634 |
| 2017/0063887 A1 * | 3/2017 | Muddu ................. G06F 16/254 |

OTHER PUBLICATIONS

U.S. Appl. No. 14/496,783, filed Sep. 25, 2014, Natanzon et al.
U.S. Appl. No. 14/496,790, filed Sep. 25, 2014, Cohen et al.
U.S. Appl. No. 14/559,036, filed Dec. 3, 2014, Natanzon et al.
U.S. Appl. No. 14/753,389, filed Jun. 29, 2015, Nir et al.
U.S. Appl. No. 14/976,719, filed Dec. 21, 2015, Natanzon.
U.S. Appl. No. 14/978,378, filed Dec. 22, 2015, Bigman et al.
U.S. Appl. No. 15/085,148, filed Mar. 30, 2016, Baruch et al.
U.S. Appl. No. 15/274,362, filed Sep. 23, 2016, Baruch et al.
U.S. Appl. No. 15/275,768, filed Sep. 26, 2016, Natanzon et al.
U.S. Appl. No. 15/275,756, filed Sep. 26, 2016, Natanzon et al.
U.S. Appl. No. 15/379,940, filed Dec. 15, 2016, Baruch et al.
U.S. Appl. No. 15/386,754, filed Dec. 21, 2016, Shemer et al.
U.S. Appl. No. 15/380,013, filed Dec. 15, 2016, Baruch et al.
U.S. Appl. No. 15/390,996, filed Dec. 27, 2016, Natanzon et al.
U.S. Appl. No. 15/391,030, filed Dec. 27, 2016, Shemer et al.
U.S. Appl. No. 15/970,243, filed May 3, 2018, Schneider et al.
U.S. Appl. No. 16/052,037, filed Aug. 1, 2018, Schneider et al.
U.S. Appl. No. 16/048,763, filed Jul. 30, 2018, Schneider et al.
U.S. Appl. No. 16/050,400, filed Jul. 31, 2018, Alkalay et al.
U.S. Appl. No. 16/179,295, filed Nov. 2, 2018, Natanzon et al.
U.S. Appl. No. 16/261,174, filed Jan. 29, 2019, Natanzon et al.
U.S. Appl. No. 16/368,008, filed Mar. 28, 2019, Natanzon et al.

* cited by examiner

AUTOMATED HOST DATA PROTECTION CONFIGURATION

BACKGROUND

Computer data is vital to today's organizations and a significant part of protection against disasters is focused on data protection. A data protection system may offer various types of data protection, such as synchronous replication, asynchronous replication, and periodic backups. Moreover, there may be many different configuration options available for each type of data protection.

In data protection systems having a vast number of machines (physical or virtual), one problem is configuring appropriate data protection for each machine. Existing solutions include policy-based configurations, whereby a user can attach a data protection policy to a VM, and the replication and backups are configured accordingly. Such solutions (sometimes referred to as "single-click" configuration) can help reduce configuration costs. For organizations managing a large number of machines (e.g., thousands or tens of thousands of machines), even single-click configuration is complex and error prone.

SUMMARY

Described herein are embodiments of systems and methods for data protection configuration that reduce complexity, errors, and cost by automatically selecting configuration profiles for VMs. In some embodiments, the described systems and methods can be scaled up to an arbitrary number of VMs, meeting the demands of large organizations.

According to one aspect of the disclosure, a method comprises: determining a set of available data protection plans; determining one or more parameters associated with a customer, a host, or a data protection system; generating a recommended host protection configuration for the host using the parameters, wherein the recommended host protection configuration includes one or more of the available data protection plans; and assigning the recommended host protection configuration to the host.

In various embodiments, determining the one or more parameters associated with the customer includes at least one of: a number of employees for the customer, an annual revenue for the customer, an industry to which the customer belongs, a data protection budget for the customer, and customer preferences. In one embodiment, determining the one or more parameters associated with the host includes at least one of: a set of applications installed on the host, a set of applications running on the host, a number of open network connections on the host, CPU usage on the host, storage usage on the host, network usage on the host, and a role for the host. In some embodiments, determining the one or more parameters associated with the data protection system includes at least one of: a number of sites associated with the data protection system, connectivity between sites associated with the data protection system, connectivity between hosts within the data protection system, and connectivity between the data protection system and an external backup site.

In certain embodiments, the set of available data protection plan comprises one or more data replication plans and one or more data backup plans. In various embodiments, the method further comprises determining a confidence level for the recommended host protection configuration; and determining a minimum confidence level for the customer, wherein assigning the recommended host protection configuration to the host comprises assigning the recommended host protection configuration to the host only if the confidence level for the recommended host protection configuration is greater than or equal to the minimum confidence level for the customer. In one embodiment, the method further comprises prompting a user to accept the recommended host protection configuration, wherein assigning the recommended host protection configuration to the host comprises assigning the recommended host protection configuration to the host only if the user accepts the recommended host protection configuration.

In some embodiments, generating the recommended host protection configuration comprises using a machine learning (ML) model. In various embodiments, the method further comprises receiving feedback information from a user regarding the recommended host protection configuration, and updating the ML model based on the feedback information.

BRIEF DESCRIPTION OF THE DRAWINGS

The foregoing features may be more fully understood from the following description of the drawings in which.

The drawings are not necessarily to scale, or inclusive of all elements of a system, emphasis instead generally being placed upon illustrating the concepts, structures, and techniques sought to be protected herein.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
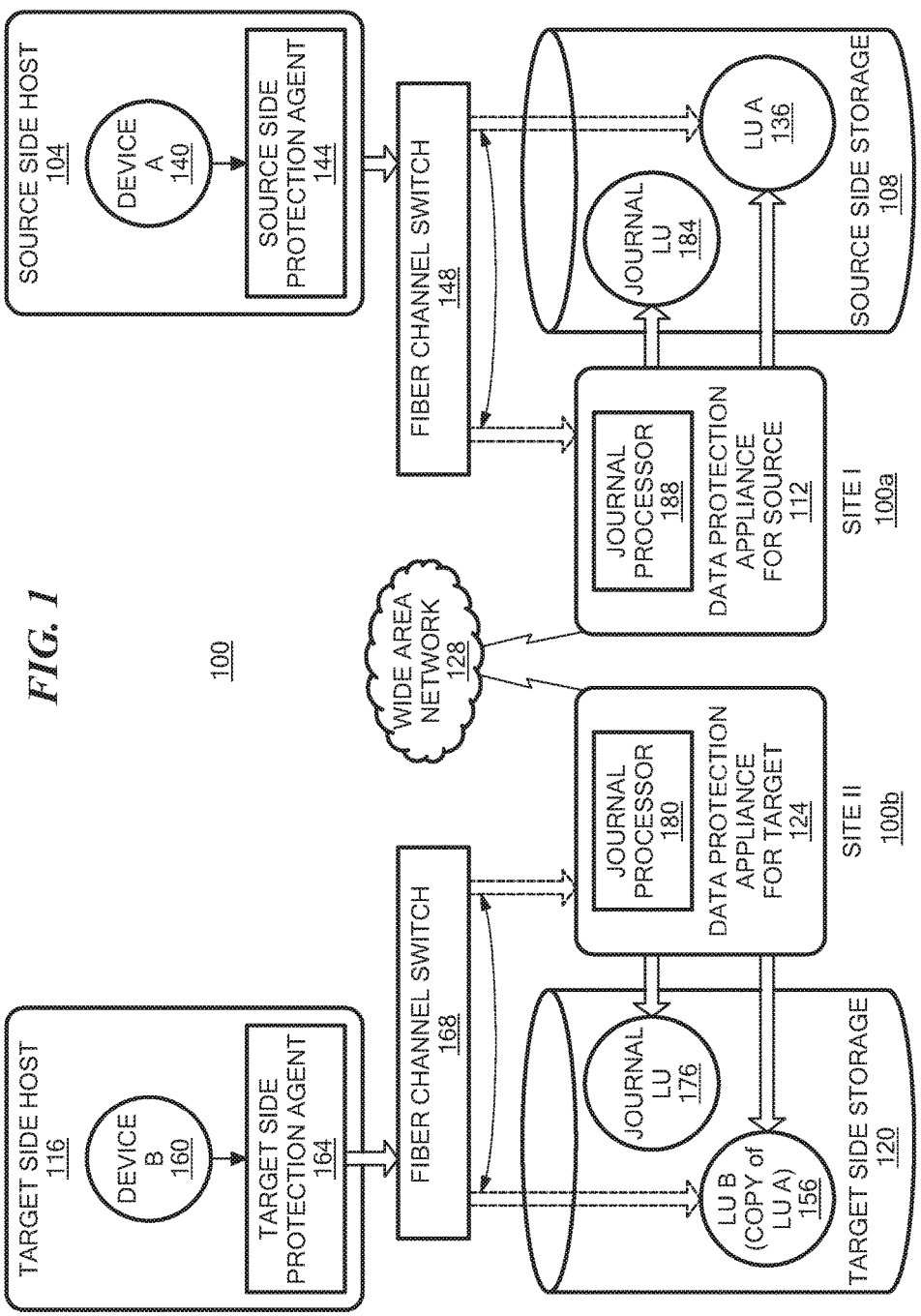
FIG. 1 is a block diagram of a data protection system, according to one embodiment of the disclosure.

Referring to the embodiment of FIG. 1, a data protection system 100 includes two sites: Site I 100a and Site II 100b. Under normal operation Site I 100a may correspond to a source side (i.e., the transmitter within a data replication workflow) of system 100 and Site II 100b may be the target side (i.e., the receiver within a data replication workflow) of the system, as shown in FIG. 1. Thus, during normal operations, the direction of replicate data flow may go from Site I 100a to Site II 100b.

In certain embodiments, Site I and Site II may be remote from one another. In other embodiments, the two sites may be local to one another. In particular embodiments, Site I and Site II may be connected via a local area network (LAN). In other embodiments, the two sites may be connected via a wide area network (WAN), such as the Internet.

In particular embodiments, the data protection system may include a failover mode of operation, wherein the direction of replicated data flow is reversed. In such embodiments, Site I may behave as a target side and Site II may behave as the source side. In some embodiments, failover may be triggered manually (e.g., by a user) or automatically. In many embodiments, failover may be performed in the event of a disaster at Site I. In some embodiments, both Site I and Site II may behave as source side for some stored data and may behave simultaneously as a target site for other stored data. In certain embodiments, a portion of stored data may be replicated from one site to the other, and another portion may not be replicated.

In some embodiments, Site I corresponds to a production site (e.g., a facility where one or more hosts run data processing applications that write data to a storage system and read data from the storage system) and Site II corresponds to a backup or replica site (e.g., a facility where replicated production site data is stored). In such embodiments, Site II may be responsible for replicating production site data and may enable rollback of Site I data to an earlier point in time. In many embodiments, rollback may be used in the event of data corruption of a disaster, or alternatively in order to view or to access data from an earlier point in time.

Referring again to FIG. 1, Site I 100a includes a source host 104, a source storage system (or "storage array") 108, and a source data protection appliance (DPA) 112 coupled via a first storage area network (SAN). Similarly, Site II 100b includes a target host 116, a target storage system 120, and a target DPA 124 coupled via a second SAN. Each SAN may include one or more devices (or "nodes") that may be designated an "initiator," a "target", or both. In the embodiment of FIG. 1, the first SAN includes a first fiber channel switch 148 and the second SAN includes a second fiber channel switch 168. Communication links between each host 104, 116 and its corresponding storage system 108, 120 may be any appropriate medium suitable for data transfer, such as fiber communication channel links. In many embodiments, a host communicates with its corresponding storage system using SCSI commands.

Referring back to FIG. 1, hosts 104 and 116 may each correspond to one computer, a plurality of computers, or a network of distributed computers. In some embodiments, a host may include a processor, volatile memory, non-volatile memory, a data bus, an I/O interface, a display interface and a network interface. In certain embodiments, a host may run at least one data processing application, such as a database application and an e-mail server.

Referring again to FIG. 1, each storage system 108, 120 may include storage devices for storing data, such as disks or arrays of disks. In some embodiments, the storage systems may be target nodes. In certain embodiments, in order to enable initiators to send requests to a storage system, the storage system may expose one or more logical units (LU) to which commands are issued. In many embodiments, the storage systems may be SAN entities that provide multiple LUs for access by multiple SAN initiators. In many embodiments, an LU is a physical or virtual logical entity provided by a storage system for accessing data stored therein. In some embodiments, a LU may be identified by a unique logical unit number (LUN).

In the embodiment of FIG. 1, storage system 108 exposes a logical unit 136, designated as LU A, and storage system 120 exposes a logical unit 156, designated as LU B. LU B may be used for replicating LU A. As such, LU B may be generated as a copy of LU A. In one embodiment, LU B may be configured so that its size is identical to the size of LU A.

Referring back to FIG. 1, the source host 104 generates a host device 140 ("Device A") corresponding to LU A and the source host 116 generates a host device 160 ("Device B") corresponding to LU B. In many embodiments, a host device is a logical entity within a host through which the host may access a LU. In some embodiments, an operating system of a host may generate a host device for each logical unit exposed by a storage system in the host SAN.

Referring again to FIG. 1, the source host 104 is configured to act as a SAN initiator that issues I/O requests through host device 140 to LU 136 ("LU A"). In some embodiments, the I/O requests include SCSI commands. In many embodiments, an I/O request includes an address that includes a specific device identifier, an offset within the device, and a data size.

Referring back to FIG. 1, the source DPA 112 and target DPA 124 may perform various data protection services, such as data replication of a storage system, and journaling of I/O requests issued by the hosts 104, 116. When acting as a target DPA, a DPA may also enable rollback of data to an earlier point-in-time (PIT), and processing of rolled back data at the target site. Each DPA 112, 124 may be a physical device, a virtual device running, or may be a combination of a virtual and physical device.

In some embodiments, a DPA may be a cluster of such computers. In many embodiments, a cluster may ensure that if a DPA computer is down, then the DPA functionality switches over to another computer. In some embodiments, computers within a DPA cluster may communicate with one another using at least one communication link suitable for data transfer via fiber channel or IP based protocols, or such other transfer protocol. In certain embodiments, one computer from the DPA cluster may serve as the DPA leader that coordinates other computers in the cluster, and may also perform other tasks that require coordination between the computers, such as load balancing.

In certain embodiments, a DPA may be a standalone device integrated within a SAN. In other embodiments, a DPA may be integrated into a storage system. In some embodiments, the DPAs communicate with their respective hosts through communication lines such as fiber channels using, for example, SCSI commands or any other protocol.

In various embodiments, the DPAs may be configured to act as initiators in the SAN. For example, the DPAs may issue I/O requests using to access LUs on their respective storage systems. In some embodiments, each DPA may also be configured with the necessary functionality to act as targets, e.g., to reply to I/O requests, such as SCSI commands, issued by other initiators in the SAN, including their respective hosts. In certain embodiments, the DPAs, acting as target nodes, may dynamically expose or remove one or more LUs.

Referring again to FIG. 1, as described herein above, Site I and Site II may each behave simultaneously as a production site and a backup site for different logical units. As such, DPA 112 and DPA 124 may each behave as a source DPA for some LUs, and as a target DPA for other LUs, at the same time.

In the embodiment of FIG. 1, hosts 104 and 116 include protection agents 144 and 164, respectively. Protection agents 144 and 164 are configured to intercept SCSI commands issued by their respective hosts to LUs via host devices (e.g. host devices 140 and 160). A protection agent may act on an intercepted SCSI command issued to a logical unit, in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. A protection agent 144, 164 may handle different SCSI commands, differently, according to the type of the command. For example, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. In certain embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. In particular embodiments, when a DPA behaves as a target device for a certain LU, then during normal course of operation, the associated protection agent fails I/O requests issued by the host to the host device corresponding to that LU.

Referring back to FIG. 1, communication between a protection agent 144, 164 and its respective DPA 112, 124 may use any protocol suitable for data transfer within a SAN, such as fiber channel, or SCSI over fiber channel. The communication may be direct, or via a logical unit exposed by the DPA.

In certain embodiments, protection agents may be drivers located in their respective hosts. In other embodiments, a protection agent may be located in a fiber channel switch or in any other device situated in a data path between a host and a storage system or on the storage system itself. In a virtualized environment, the protection agent may run at the hypervisor layer or in a virtual machine providing a virtualization layer.

Referring again to FIG. 1, the target storage system 120 exposes a journal LU 176 for maintaining a history of write transactions made to LU 156, referred to herein as a "journal." The journal may be used to provide access to storage at specified points in time. In some embodiments, the journal may be stored across multiple LUs (e.g., using striping).

In the embodiment of FIG. 1, the target DPA 124 includes a journal processor 180 for managing the journal within LU 176. The journal processor 180 is configured to manage the journal entries of LU B 156. Specifically, journal processor 180 may enter write transactions received by the target DPA 124 from the source DPA 112 into the journal by writing them into the journal LU 176, read the undo information for the transaction from LU B 156, update the journal entries in the journal LU 176 with undo information, apply the journal transactions to LU B 156, and remove already-applied transactions from the journal.

In one embodiment, the journal processor 180 is configured to perform processing described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Embodiments of the data replication system may be provided as physical systems for the replication of physical LUs, or as virtual systems for the replication of virtual LUs. In one embodiment, a hypervisor may consume LUs and may generate a distributed file system on the logical units such as VMFS, for example, generates files in the file system and exposes the files as LUs to the virtual machines (each virtual machine disk is seen as a SCSI device by virtual hosts). In another embodiment, a hypervisor may consume a network based file system and exposes files in the NFS as SCSI devices to virtual hosts.

Referring back to FIG. 1, in normal operation (sometimes referred to as "production mode"), the DPA 112 acts as a source DPA for LU 136 ("LU A"). Thus, protection agent 144 is configured to act as a source protection agent, specifically by splitting I/O requests to host device 140 ("Device A"). The protection agent 144 may send an I/O request to source DPA 112 and, after receiving an acknowledgement therefrom, may send the I/O request to LU 136. After receiving a second acknowledgement from storage system 108, the host 104 may acknowledge that the I/O request has successfully completed.

When source DPA 112 receives a replicated I/O request from protection agent 144, source DPA 112 may transmit certain I/O information characterizing the write request, packaged as a "write transaction", over WAN 128 to the target DPA 124 for journaling and for incorporation within target storage system 120. When applying write operations to storage system 120, the target DPA 124 may act as an initiator, and may send SCSI commands to LU 156 ("LU B").

The source DPA 112 may send its write transactions to target DPA 124 using a variety of modes of transmission, including inter alia (i) a synchronous mode, (ii) an asynchronous mode, and (iii) a batch mode. In synchronous mode, the source DPA 112 may send each write transaction to the target DPA 124, may receive back an acknowledgement from the target DPA 124, and in turns may send an acknowledgement back to protection agent 144.

In synchronous mode, protection agent 144 may wait until receipt of such acknowledgement before sending the I/O request to LU 136. In asynchronous mode, the source DPA 112 may send an acknowledgement to protection agent 144 upon receipt of each I/O request, before receiving an acknowledgement back from target DPA 124.

In batch mode, the source DPA 112 may receive several I/O requests and combines them into an aggregate "batch" of write activity performed in the multiple I/O requests, and may send the batch to the target DPA 124, for journaling and for incorporation in target storage system 120. In batch mode, the source DPA 112 may send an acknowledgement to protection agent 144 upon receipt of each I/O request, before receiving an acknowledgement back from the target DPA 124.

As discussed above, in normal operation, LU B 156 may be used as a backup of LU A 136. As such, while data written to LU A by host 104 is replicated from LU A to LU B, the target host 116 should not send I/O requests to LU B. To prevent such I/O requests from being sent, protection agent 164 may act as a target side protection agent for host device B 160 and may fail I/O requests sent from host 116 to LU B 156 through host device B 160.

Still referring to FIG. 1, in recovery mode, the target DPA 124 may undo the write transactions in the journal LU 176 so as to restore the target storage system 120 to an earlier state.

In many embodiments, the data protection system provides various types of data protection, such as synchronous replication, asynchronous replication, and periodic backups.

Figure 2:
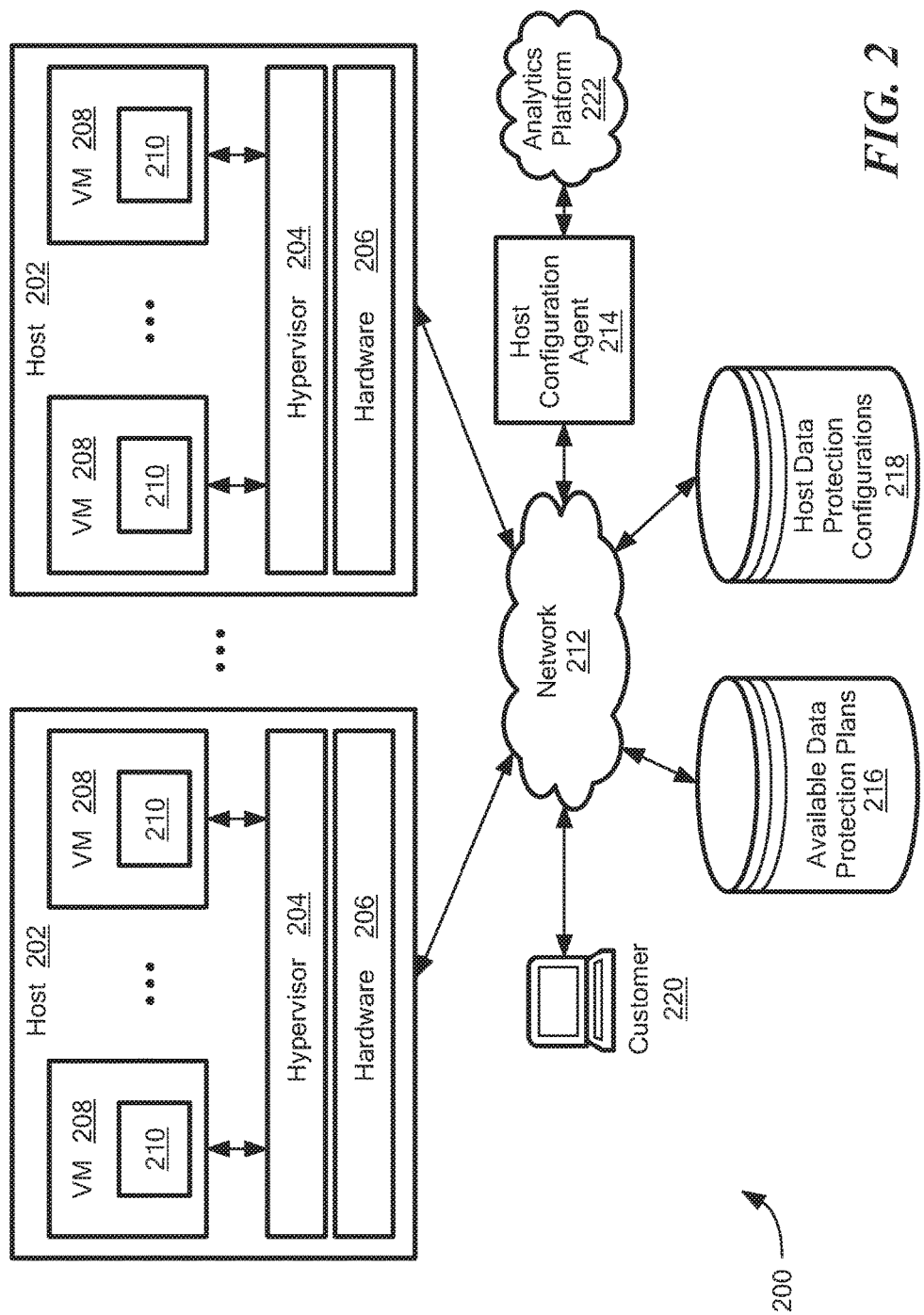
FIG. 2 is a block diagram of a data protection system, according to another embodiment of the disclosure.

Referring to the embodiment of FIG. 2, a data protection system 200 includes one or more hosts 202, a host configuration agent 214, an available data protection plan database (or "available plan database") 216, and a host data protection configuration database (or "host configuration database") 218, each of which may be coupled together via a network 212. The data protection system 200 may be associated with a customer, such as a business or other type of organization. In some embodiments, the data protection system includes additional components that are omitted from FIG. 2 to promote clarity. For example, the data protection system could also include a storage area network (SAN), a storage array, a data protection appliance (DPA), and/or one or more protection agents.

In the embodiment of FIG. 2, one or more of the hosts 202 may correspond to a virtualized host having a hypervisor 204 that runs on and controls the host's hardware 206, along with one or more virtual machines (VMs) 208 managed by the hypervisor 204. A VM 208 may be the same as or similar to host 104 or 116 in FIG. 1.

In some embodiments, one or more of the hosts may correspond to a non-virtualized host having an OS that runs directly accesses physical hardware. In certain embodiments, a non-virtualized host may be the same as or similar to host 104 or 116 in FIG. 1. In certain embodiments, the data protection system includes both of virtualized and non-virtualized hosts.

In some embodiments, the hosts may be collocated within a single site (e.g., a single data center). In other embodiments, the hosts may be distributed across multiple sites.

Referring again to FIG. 2, the available plan database 216 stores a set of available data protection plans that can be assigned to individual VMs 208. Each available protection plan may have one or more parameters associated with it. The collection of protection plans and corresponding parameter values assigned to a given VM is referred to as a "host protection configuration." The host configuration database 218 stores host protection configurations for one or more of the VMs 208.

One available data protection plan is data replication. The associated parameters may include: (1) replication type, e.g., synchronous continuous replication, asynchronous continuous replication, and asynchronous snapshot-based replication; and (2) journal retention time.

Another available data protection plan is data backups. The associated parameters may include: (1) how often backups are performed, e.g., every six hours, every twenty-four hours, etc.); (2) whether full or incremental backups are performed; (3) how long backups are retained for; (4) which backup copies are retained; (5) location(s) where backups are stored, e.g., local, remote, or in a cloud backup system; and (6) a backup restore policy, i.e., where to push the backups in order to guarantee a maximum time-to-restore.

In certain embodiments, the set of available protection plans may be shared across data protection systems and/or customers. In some embodiments, the customer may generate proprietary protection plans that can be added to the set of available plans (e.g., they may be stored within the available plan database 216). In one embodiment, the customer may download protection plans from an external repository into the set of available plans. In the embodiment of FIG. 2, the customer may use a customer management interface 220 to generate proprietary protection plans and/or download protection plans into the available plan database 216.

In some embodiments, the databases 216 and 218 are provided as separate logical databases stored within the same physical database. In other embodiments, the databases 216 and 218 may be provided as separate physical databases. In certain embodiments, one or both databases 216 and 218 may be stored within a storage array (e.g., storage array 108 in FIG. 1).

Referring back to FIG. 2, different VMs 208 may run different types of applications. For example, one host 202 may run a database server application, whereas another host 202 may run a web server application. A VM 208 may include an app detection component 210 configured to identify applications installed and/or running on the VM. Using this information, the app detection component 210 can determine the VM's role from among a predetermined set of roles. Non-limiting examples of VM roles include "database server," "web server," and "desktop machine." In certain embodiments, an app detection component may be provided as a commercial off-the-shelf (COTS) product configured to analyze applications.

Referring back to the example embodiment of FIG. 2, the host configuration agent 214 is configured to collect various input parameters for a VM and, based on these parameters, to generate a recommended data protection configuration for the VM. In various embodiments, the host configuration agent generates a confidence level for each recommended host protection configuration.

In some embodiments, host configuration agent input parameters may include parameters associated with the customer ("customer parameters"). Non-limiting examples of customer parameters include: the number of employees the customer has, the customer's annual revenue, the industry the customer belongs to, the customer's data protection budget, and customer preferences. Non-limiting examples of customer preferences include a minimum acceptable confidence level and an automatic confidence level. In certain embodiments, a minimum acceptable confidence level is a confidence level above which a recommendation made by the host configuration agent must exceed in order for that recommendation to be presented to the customer for approval. In some embodiments, an automatic confidence level is a confidence level above which a recommendation made by the host configuration agent is automatically applied to a host without requiring user approval. In many embodiments, some or all of the aforementioned customer information may be stored within a system database (e.g., database 216 or database 218), or may be retrieved from an external source. Referring to FIG. 2, a customer may enter preferences and other customer information via the customer management interface 220.

In certain embodiments, host configuration agent input parameters may include information about the VM ("host-level parameters"). In some embodiments, host-level parameters include the VM's role as determined by its app detection component (e.g., app detection component 210 in FIG. 2). In certain embodiments, host-level parameters include key performance indicators (KPI), including but not limited to: a number of open network connections on the host, CPU usage on the host, storage usage on the host, and network usage on the host.

In various embodiments, host configuration agent input parameters include parameters associated with the data protection system topology ("system-level parameters"). For example, system-level parameters may include the number of sites (e.g., data centers) across which the system is distributed. As another example, system-level parameters may include the type of network connectivity between hosts and/or sites. As yet another example, the system-level parameters may include network connectivity to external backup storage (e.g., connectivity to an external cloud-based backup system).

Referring back to FIG. 2, the host configuration agent 214 may use machine-learning (ML) techniques to generate a recommended host protection configuration and corresponding confidence level. The recommended host protection configuration may include one or more plans from the available plan database 216. In some embodiments, the ML model is shared across multiple customers and/or data protection systems (i.e., "crowd sourcing" can be employed). In the embodiment of FIG. 2, the host configuration agent 214 uses an external analytics platform 222 to generate recommended host protection configurations.

Referring back to FIG. 2, the host configuration agent 214 (and/or a ML model used thereby) may utilize one or more customer parameters to recommend a host protection configuration. In one embodiment, if the customer's industry includes regulations regarding data retention, the host configuration manager may recommend that data backups be generated for all VMs and retained for at least the prescribed time period. In some embodiments, the host configuration manager rejects a recommended host protection configuration if the corresponding confidence level is below the minimum confidence level set for the customer. In particular embodiments, the host configuration manager automatically applies a host protection configuration if the corresponding confidence level is above the automatic confidence level set for the customer. In certain embodiments, the host configuration manager considers the customers budget when generating a recommended host protection configuration. For example, to stay within with a customer's budget constraints, less expensive data backups may be recommended over more expensive data replication. In some embodiments, the host configuration manager may be use the customer size and/or revenue configuration identify other customers having a similar size and/or revenue and to recommend host protection configuration using information learned about those other customers.

Referring again to FIG. 2, the host configuration agent 214 (and/or a ML model used thereby) may utilize one or more host-level parameters to recommend a host protection configuration. In certain embodiments, the host configuration agent 214 considers the VM's role when recommending a host protection configuration. For example, if the VM is classified as a database server, the host configuration agent 214 may recommend synchronous replication, local backups every six hours (6) for one week, and cloud-based backups every day for one month. As another example, if the VM is classified as a web server, the host configuration agent 214 may recommend backups every twenty-four (24) hours.

Referring back to FIG. 2, the host configuration agent 214 (and/or a ML model used thereby) may utilize one or more system-level parameters to recommend a host protection configuration. In one embodiment, if there is no connectivity (or limited connectivity) to external backup storage, the host configuration agent does not recommend that external backups be performed. In certain embodiments, if a VM is connected to and/or used by other VMs, it may be assigned a host protection configuration providing a relatively high level of data protection.

In some embodiments, the system may prompt the customer (e.g., via the customer management interface 220) to approve or reject a recommended host protection. If a customer approves, the recommended protection configuration may be assigned to the host and used to provide data protection thereto. In some embodiments, the host protection configuration is stored within the host protection configuration database (e.g., database 218 in FIG. 2). In some embodiments, the approved host protection configuration may be applied to the VM (e.g., used to configure a protection agent 144 of FIG. 1). In many embodiments, if a customer rejects the recommended configuration, the host configuration agent may generate alternate recommendations for customer approval. In certain embodiments, the host configuration agent uses customer feedback information to learn customer behavior and to improve the quality of future recommendations (e.g., the ML model may be updated based on customer feedback). In some embodiments, the host configuration agent may learn customer preferences based on previous configuration choices.

In certain embodiments, the host configuration agent can re-evaluate the existing host protection configuration for one or more VMs. In some embodiments, host protection configuration may be re-evaluated periodically. In certain embodiments, host protection configuration may be re-evaluated in response to a user request (e.g., via the customer management interface 220). In particular embodiments, host protection configuration may be re-evaluated in response to changes within the system, e.g., new information about a VM, changes in system or VM configuration, changes to the customer's budget, changes or updates to the ML model, and/or improvements within an external analytics platform. Previous decisions by the customer to accept or reject recommendations may be to train the ML model.

As shown in the embodiment of FIG. 2, the host configuration agent 214 may run on a machine separate from the hosts 202. In other embodiments, a host configuration agent may run within a hypervisor.

Figure 3:
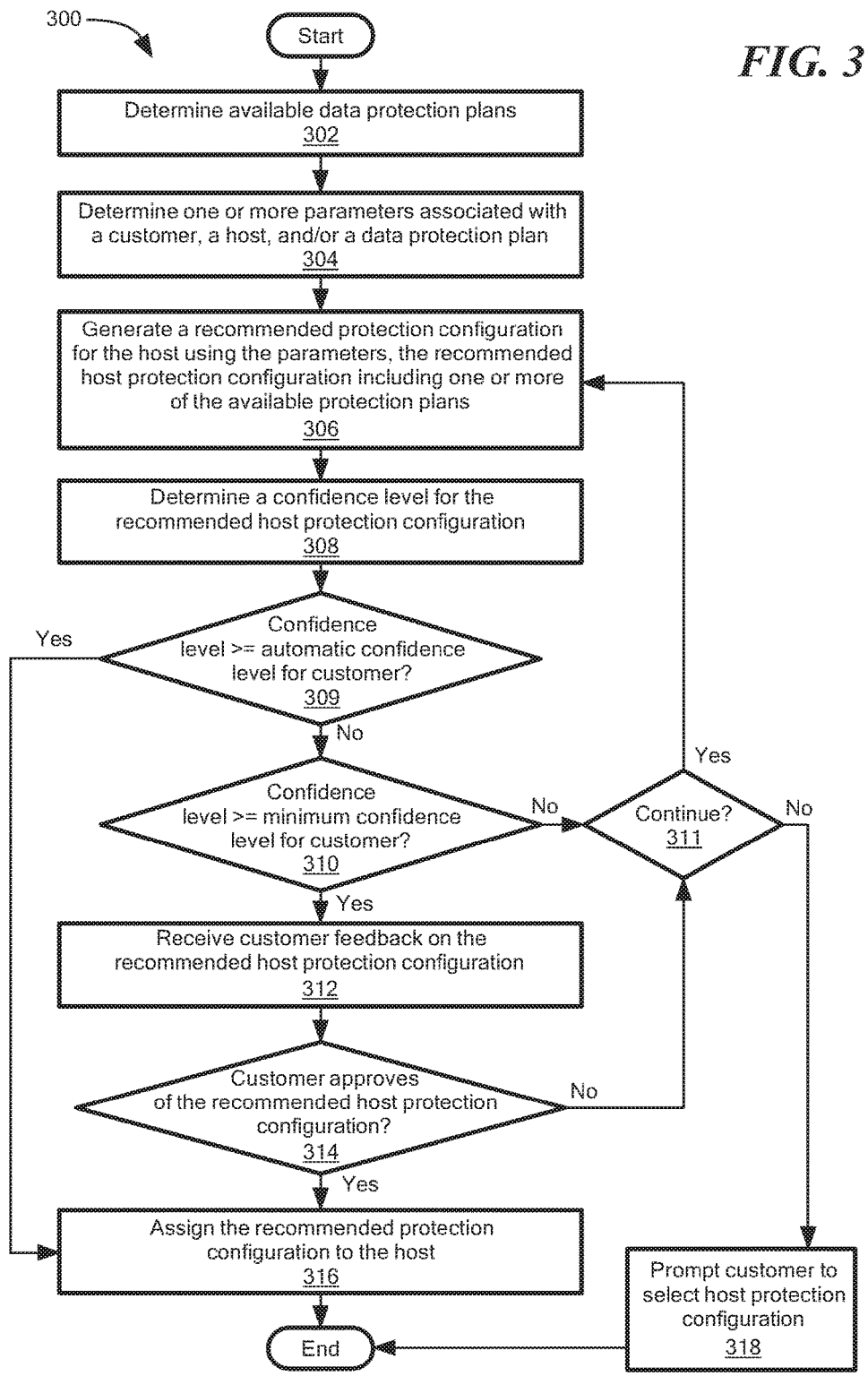
FIG. 3 is a flow diagram of a method for automated host data protection configuration, according to embodiment of the disclosure.

FIG. 3 is a flow diagram showing illustrative processing that can be implemented within a data protection system (e.g., data protection system 100 of FIG. 1 and/or data protection system 200 of FIG. 2). In one embodiment, at least a portion of the processing described herein may be implemented within a host configuration agent (e.g., host configuration agent 214 of FIG. 2). Rectangular elements (typified by element 302), herein denoted "processing blocks," represent computer software instructions or groups of instructions. Diamond shaped elements (typified by element 310), herein denoted "decision blocks," represent computer software instructions, or groups of instructions, which affect the execution of the computer software instructions represented by the processing blocks.

Alternatively, the processing and decision blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

Referring to the example embodiment of FIG. 3, a method 300 can be used to assign data protection configuration to a host within a data protection system (e.g., a host 104, 116 in FIG. 1 and/or a VM 208 in FIG. 2). The host may be associated with a particular customer. At block 302, one or more available data protection plans are determined. In some embodiments, this includes querying a database of available data protection plans.

Referring back to FIG. 3, at block 304, one or more customer parameters, host-level parameters, and/or system-level parameters may be determined. At block 306, a data protection configuration is recommended for the host using the parameters. The recommended host protection configuration includes one or more of the available data protection plans. At block 308, a confidence level is determined for the recommended host protection configuration. In some embodiments, machine-learning (ML) techniques may be used to generate the recommended host protection configuration and the corresponding confidence level.

Referring again to FIG. 3, if the confidence level is greater than or equal to the customer's automatic confidence level (block 309), then the recommended protection configuration may be automatically assigned to the host. If the confidence level is less than the customer's minimum confidence level (block 310), then a decision may be made (block 311) as to whether to generate an alternate recommendation, or whether to prompt the customer to select a host protection plan and parameters for the host (block 318). In some embodiments, decision block 311 includes determining if a maximum number of recommendations have already been made.

If the confidence level is below the customer's automatic confidence level but greater than or equal to the customer's minimum confidence level, then the customer may be promoted to approve or reject the recommended host protection plan (block 312). If the customer approves (block 314), then the recommended protection configuration may be assigned to the host (block 316). Otherwise, processing may proceed to block 311, as described above.

In some embodiments, the host protection configuration is stored within the host protection configuration database. In certain embodiments, the approved host protection configuration may be applied to the host. In some embodiments, if a customer rejects the recommended configuration, an alternate configuration may be generated, as shown. In certain embodiments, customer feedback information is used to update a ML model.

Figure 4:
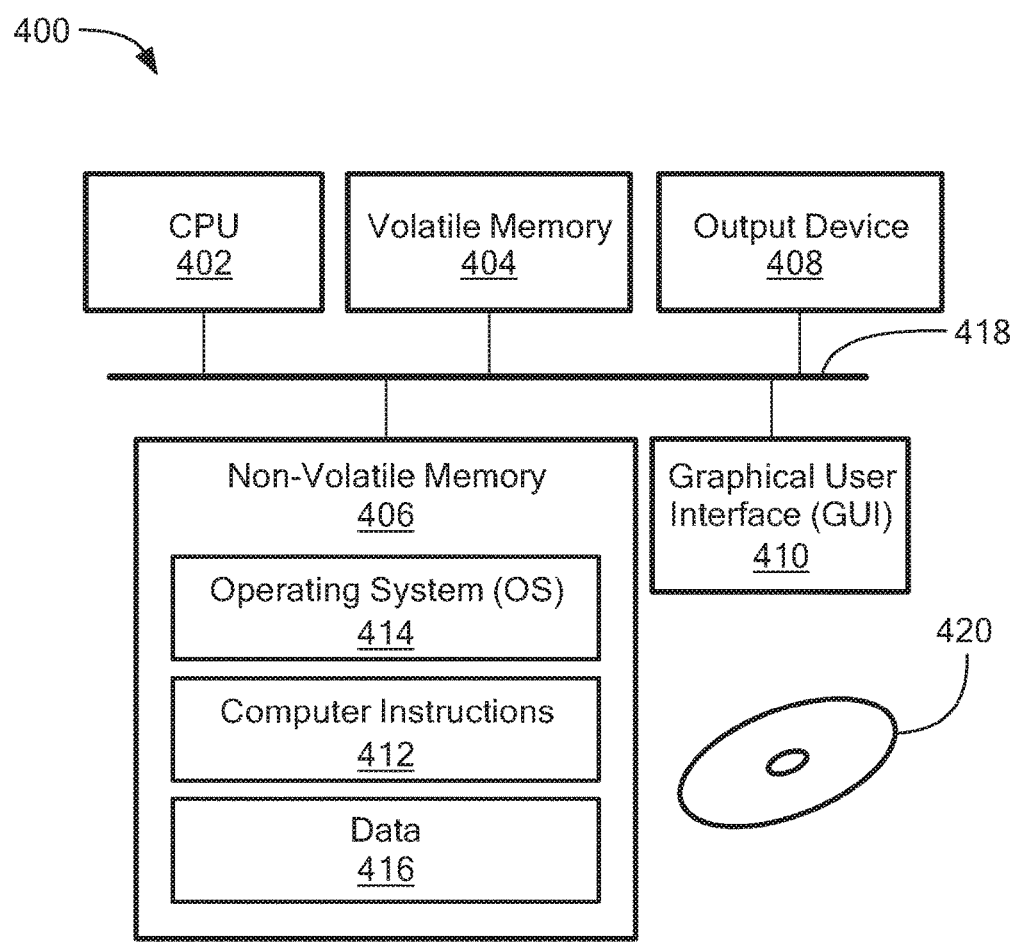
FIG. 4 is a block diagram of a computer on which the method of FIG. 3 may be implemented, according to an embodiment of the disclosure.

FIG. 4 shows a computer 400 that can perform at least part of the processing described herein, according to one embodiment. The computer 400 may include a processor 402, a volatile memory 404, a non-volatile memory 406 (e.g., hard disk), an output device 408 and a graphical user interface (GUI) 410 (e.g., a mouse, a keyboard, a display, for example), each of which is coupled together by a bus 418. The non-volatile memory 406 may be configured to store computer instructions 412, an operating system 414, and data 416. In one example, the computer instructions 412 are executed by the processor 402 out of volatile memory 404. In one embodiment, an article 420 comprises non-transitory computer-readable instructions. In some embodiments, the computer 400 corresponds to a virtual machine (VM). In other embodiments, the computer 400 corresponds to a physical computer.

Processing may be implemented in hardware, software, or a combination of the two. In various embodiments, processing is provided by computer programs executing on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate. The program logic may be run on a physical or virtual processor. The program logic may be run across one or more physical or virtual processors.

Processing may be performed by one or more programmable processors executing one or more computer programs to perform the functions of the system. All or part of the system may be implemented as special purpose logic circuitry (e.g., an FPGA (field programmable gate array) and/or an ASIC (application-specific integrated circuit)).

All references cited herein are hereby incorporated herein by reference in their entirety.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described hereinabove may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method for automated host data protection configuration in a data protection system, comprising:
    determining, by a host configuration agent of the data protection system, one or more parameters associated with a customer, a host, or a data protection system;
    generating, by the host configuration agent, a recommended host protection configuration for the host using the parameters, wherein the recommended host protection configuration includes one or more protection plans including a data replication plan that specifies one or more parameters for performing a data replication operation and a data backup plan that specifies one or more parameters for performing a data backup operation, wherein the recommended host protection configuration includes a synchronous data replication operation and a local data backup operation in response to the one or more parameters includes a virtual machine that is executed on the host being classified as a database server; and
    assigning, by the host configuration agent, the recommended host protection configuration to the host.

2. The method of claim 1 wherein determining the one or more parameters associated with the customer includes at least one of:
   a number of employees for the customer;
   an annual revenue for the customer;
   an industry to which the customer belongs; and
   customer preferences.

3. The method of claim 1 wherein determining the one or more parameters associated with the host includes at least one of:
   a set of applications installed on the host;
   a set of applications running on the host;
   a number of open network connections on the host;
   CPU usage on the host;
   storage usage on the host;
   network usage on the host; and
   a role for the virtual machine.

4. The method of claim 1 wherein determining the one or more parameters associated with the data protection system includes at least one of:
   a number of sites associated with the data protection system;
   connectivity between sites associated with the data protection system;
   connectivity between hosts within the data protection system; and
   connectivity between the data protection system and an external backup site.

5. The method of claim 1, wherein generating the recommended host protection configuration includes using a machine learning (ML) model that is shared across multiple data protection systems.

6. The method of claim 1 further comprising:
   determining a confidence level for the recommended host protection configuration; and
   determining a minimum confidence level for the customer,
   wherein assigning the recommended host protection configuration to the host comprises assigning the recommended host protection configuration to the host only if the confidence level for the recommended host protection configuration is greater than or equal to the minimum confidence level for the customer.

7. The method of claim 6 further comprising:
   prompting a user to accept the recommended host protection configuration,
   wherein assigning the recommended host protection configuration to the host comprises assigning the recommended host protection configuration to the host only if the user accepts the recommended host protection configuration.

8. A system for automated host data protection configuration in a data protection system, comprising:
   one or more processor;
   a volatile memory; and
   a non-volatile memory storing computer program code that when executed on the processor causes execution across the one or more processors of a process operable to perform the operations of:
      determining a set of available data protection plans;
      determining one or more parameters associated with a customer, a host, or a data protection system;
      generating a recommended host protection configuration for the host using the parameters, wherein the recommended host protection configuration includes one or more protection plans including a data replication plan that specifies one or more parameters for performing a data replication operation, and a data backup plan that specifies one or more parameters for performing a data backup operation, wherein the recommended host protection configuration includes a synchronous data replication operation and a local data backup operation in response to the one or more parameters includes a virtual machine that is executed on the host being classified as a database server; and
      assigning, by the host configuration agent, the recommended host protection configuration to the host.

9. The system of claim 8 wherein the computer program code causes execution of a process to determine the one or more parameters associated with the customer includes at least one of:
   a number of employees for the customer;
   an annual revenue for the customer;
   an industry to which the customer belongs; and
   customer preferences.

10. The system of claim 8 wherein the computer program code causes execution of a process to determine the one or more parameters associated with the host includes at least one of:
    a set of applications installed on the host;
    a set of applications running on the host;
    a number of open network connections on the host;
    CPU usage on the host;
    storage usage on the host;
    network usage on the host; and
    a role for the virtual machine.

11. The system of claim 8 wherein the computer program code causes execution of a process to determine the one or more parameters associated with the data protection system includes at least one of:
    a number of sites associated with the data protection system;
    connectivity between sites associated with the data protection system;
    connectivity between hosts within the data protection system; and
    connectivity between the data protection system and an external backup site.

12. The system of claim 8 wherein the computer program code causes execution of a process further operable to perform the operations of:
    determining a confidence level for the recommended host protection configuration; and
    determining a minimum confidence level for the customer,
    wherein assigning the recommended host protection configuration to the host comprises assigning the recommended host protection configuration to the host only if the confidence level for the recommended host protection configuration is greater than or equal to the minimum confidence level for the customer.

13. The system of claim 12 wherein the computer program code causes execution of a process further operable to perform the operations of:
    prompting a user to accept the recommended host protection configuration,
    wherein assigning the recommended host protection configuration to the host comprises assigning the recommended host protection configuration to the host only if the user accepts the recommended host protection configuration.

14. The system of claim 8, wherein generating the recommended host protection configuration includes using a machine learning (ML) model that is shared across multiple data protection systems.

15. A computer program product tangibly embodied in a non-transitory computer-readable medium, the computer-readable medium storing program instructions that are executable to:
   determine a set of available data protection plans;
   determine one or more parameters associated with a customer, a host, or a data protection system;
   generate a recommended host protection configuration for the host using the parameters, wherein the recommended host protection configuration includes one or more protection plans including a data replication plan that specifies one or more parameters for performing a data replication operation and a data backup plan that specifies one or more parameters for performing a data backup operation, wherein the recommended host protection configuration includes a synchronous data replication operation and a local data backup operation in response to the one or more parameters includes a virtual machine that is executed on the host being classified as a database server; and
   assign the recommended host protection configuration to the host.

16. The computer program product of claim 15, wherein generating the recommended host protection configuration includes using a machine learning (ML) model that is shared across multiple data protection systems.

\* \* \* \* \*